May 11, 1965 W. GOLDSTEIN 3,183,521

GLASS APERTURE PLATE

Filed Feb. 21, 1962

INVENTOR
WALTER GOLDSTEIN
BY Leonard H. King
ATTORNEY 3,183,521
GLASS APERTURE PLATE
Walter Goldstein, 75 Main St., Dobbs Ferry, N.Y.
Filed Feb. 21, 1962, Ser. No. 174,877
6 Claims. (Cl. 352—221)

This invention relates to a glass aperture plate assembly adapted to be used with film strip projectors, and more specifically with means for preventing the film strip from sticking to the aperture plates.

In the conventional film strip projector the film strip is introduced into a slot formed by two glass aperture plates spaced closely together. The plates are designed to keep the film flat and at right angles to the optical axis of the lens and light system of the projector. Thus the plates are of critical importance in obtaining a clear sharp image from the projector. In many cases it is necessary to keep an individual picture frame in the projector for some time, as during a lecture where the subject matter on the frame is discussed at length. In such case, considerable heating of the strip takes place in spite of the conventional fan means used in these projectors since the lamp power dissipation is usually 750 watts or higher. Such heat has the tendency to release moisture held in the gelatin emulsion of the film strip. The released moisture causes the film to stick, buckle and/or bind in the aperture plates.

Briefly stated, the present invention provides a pair of glass aperture plates provided with low friction raised transparent portions for prevention of adhesion of film passing through said aperture plates.

It is therefore a primary object of the present invention to eliminate binding of the film strip in a glass pressure plate assembly.

It is a further object of the present invention to provide means for carrying away moisture released as the film strip is unrolled.

These and other objects of the present invention will be pointed out with particularity or become apparent in the following description taken together with the attendant drawings, in which.

Figure 1:
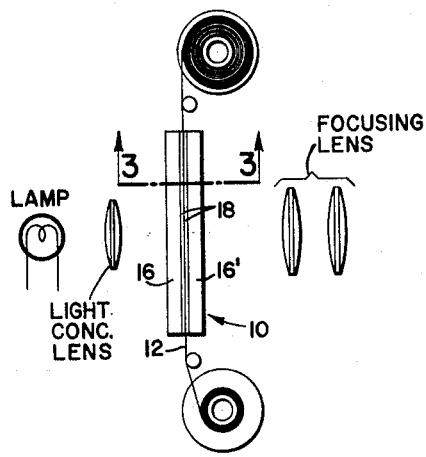
FIG. 1 is a schematic representation of a film strip projector embodying the device of the present invention.
Figure 3:
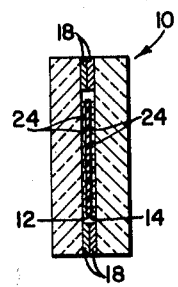
FIG. 3 is a view taken along line 3—3 of FIG. 1.
Figure 2:
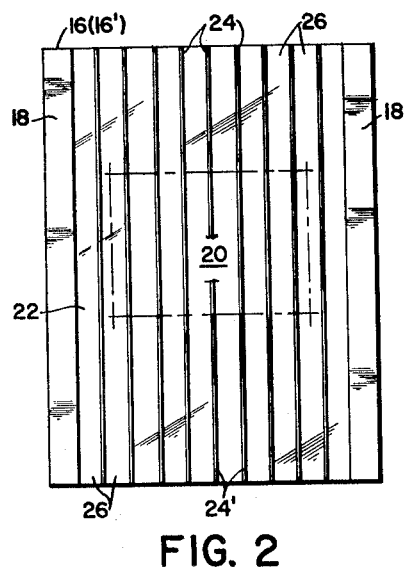
FIG. 2 is a plan view of an individual glass aperture plate of the present invention.

Referring more specifically to the drawings, there is shown in FIG. 1 a schematic representation of a film strip projector, wherein the device of the present invention, characterized generally by the numeral 10, forms the glass plate aperture assembly. Film strip 12 is passed through the slot 14 formed by plate 16 and 16' which are maintained by conventional mounting means (not shown) disposed on the casing of the projector. As shown in FIG. 2, plates 16–16' are of rectangular configuration and are made of a suitably high grade of optical glass. A metal strip 18 is formed along each side of the plates and, in the assembled condition, these strips serve as spacing members which define slot 14, as indicated in FIG. 3. It will be noted that the plates are placed as close together as possible in order to keep the film strip flat and at a correct angle relative to the optical axis, for maximum definition of the projected image. As shown in FIG. 1, the film strip is relatively close to the light source, usually a lamp of about 750 watts. The heat generated by the lamp has the tendency to release moisture that has been absorbed in the gelatin emulsion of the film strip. This moisture, operating in conjunction with a film buckling under heating, often results in sticking and jamming of the film.

As shown in FIG. 3, the surface of the glass plate has formed herein a plurality of strips or bands 24 in spaced configuration. These bands are generally parallel and aligned along the axis of the film strip travel. In a preferred embodiment, these bands are formed by vapor deposition of silicon monoxide (SiO) which is deposited in extremely thin layer from about 0.00001 inch at thickness and about 1/16 of an inch wide. The silicon monoxide is converted to quartz, $SiO_2$, by heating the plate. These bands form a series of minutely raised areas, shown in exaggerated form in FIG. 3, with the uncoated glass of surface 22 lying between adjacent bands forming channels 26. It has been found that the channels formed in this manner make a pathway for the moisture released by the heat action of the projector lamp upon the film emulsion. The bands exert a "squeegee" action which prevents adhesion of moisture to the film strip. The moisture is drawn into channels 26 and travels downward the length of the aperture plates 16–16', including the projection area 20, indicated in phantom, FIG. 2. It has been found that these quartz deposits have no adverse effect on the quality of image projection.

Considerable friction exists where a strip has been buckled and is being moved through the conventional plate assembly. In such cases, the film frequently sticks to the plates. The present invention eliminates this to a great extent, since it has been found that the tracks act as friction-free elements, considerably reducing the binding action.

It will be appreciated that substances other than silicon dioxide may be employed to form the strips, provided they have the desirable properties of hardness, good adhesion to glass, ability to form a smooth coat, resistance to corrosion and chemical inertness with regard to the film emulsion. It will be appreciated that these materials must be transparent, since they are also deposited over aperture area 20.

The preferred method for forming stripes 24 on a surface of the plate is by vapor deposition, as this method can achieve a film of extreme thinness with close control of dimensions. The deposit may be substantially thicker than 0.00001, with an upper limit being approximately 0.0001".

Figure 4:
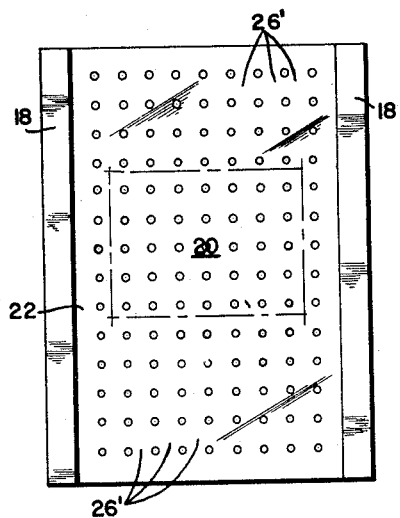
FIG. 4 is an alternate embodiment of the present invention.

Since the function of the deposit is to create a raised area above the surface of the glass, it is not essential that the deposit be of a continuous strip. Thus, discrete areas of material may be deposited in spaced alignment, to form longitudinal raised ridges, as best shown in FIG. 4. In this embodiment, the area of glass between the rows defines channels 26'.

It will be appreciated that the device of the present invention is applicable to devices other than film strip projectors, namely, instances where a moisture-retaining sheet of film material is passed betwen closely spaced glass plates, as in other types of photographic equipment.

On the other hand, the glass plate may be etched by chemical, sandblasting, or ultrasonic machining techniques to form recesses in the plate. Thus, if there is material removed, the areas of FIGS. 2 and 4 shown as raised areas, would be depressed areas.

Other changes and modifications within the scope of the invention will occur to those skilled in the art, without however departing from envisioned scope of the invention, as set forth in the following claims.

What is claimed is:

1. A glass aperture plate for use in a plate assembly for holding film in spaced relation to a light source, said film being normally movable in a given direction past said light source, said plate having a portion of the surface thereof including the projection area covered in a pattern with light transparent ridges of permanently adhering material comprising silicon dioxide ($SiO_2$) of a thickness from $10^{-5}$ to $10^{-4}$ inches, said material being characterized by smoothness and hardness whereby a minor proportion of the film surface within the projection area is supported by said ridges.

2. A device as in claim 1 wherein said permanently adhering material is formed in generally parallel bands of a width of approximately 1/16 of an inch, disposed in the direction of film strip travel.

3. A glass aperture plate assembly for holding film in spaced relation to a light source, said film being normally movable in a given direction past said light source, said assembly comprising a first glass plate and a second glass plate, said plates being disposed in confronting relationship to each other, the faces of said opposing plates having formed on portions thereof including the projection area a pattern of relatively thin ridges of permanently adhering material characterized by smoothness and hardness whereby a minor proportion of the film surface within the projection area is supported by said ridges, said material comprising silicon dioxide ($SiO_2$) of a thickness from $10^{-5}$ to $10^{-4}$ inches.

4. A device as in claim 3 wherein said permanently adhering material is formed in the configuration of discrete raised portions.

5. A device as in claim 3, wherein said pattern comprises generally parallel narrow bands of said material aligned in the direction as of said movement of said film to define a plurality of channels formed by adjacent bands.

6. A device as in claim 5, wherein said permanently adhering material is formed in generally parallel bands of a width of approximately 1/16 of an inch, disposed in the direction of film travel.

References Cited by the Examiner

UNITED STATES PATENTS

| | | | |
|---|---|---|---|
| 1,154,819 | 9/15 | White | 88—28 |
| 1,957,904 | 5/34 | Ord | 352—221 |
| 2,102,161 | 12/37 | Newman | 352—221 |
| 2,534,732 | 12/50 | Perillo | 352—163 |
| 2,685,225 | 8/54 | Haefele | 352—224 |

FOREIGN PATENTS

| | | |
|---|---|---|
| 1,136,679 | 12/56 | France. |
| 525,110 | 8/40 | Great Britain. |

JULIA E. COINER, *Primary Examiner.*